UNITED STATES PATENT OFFICE.

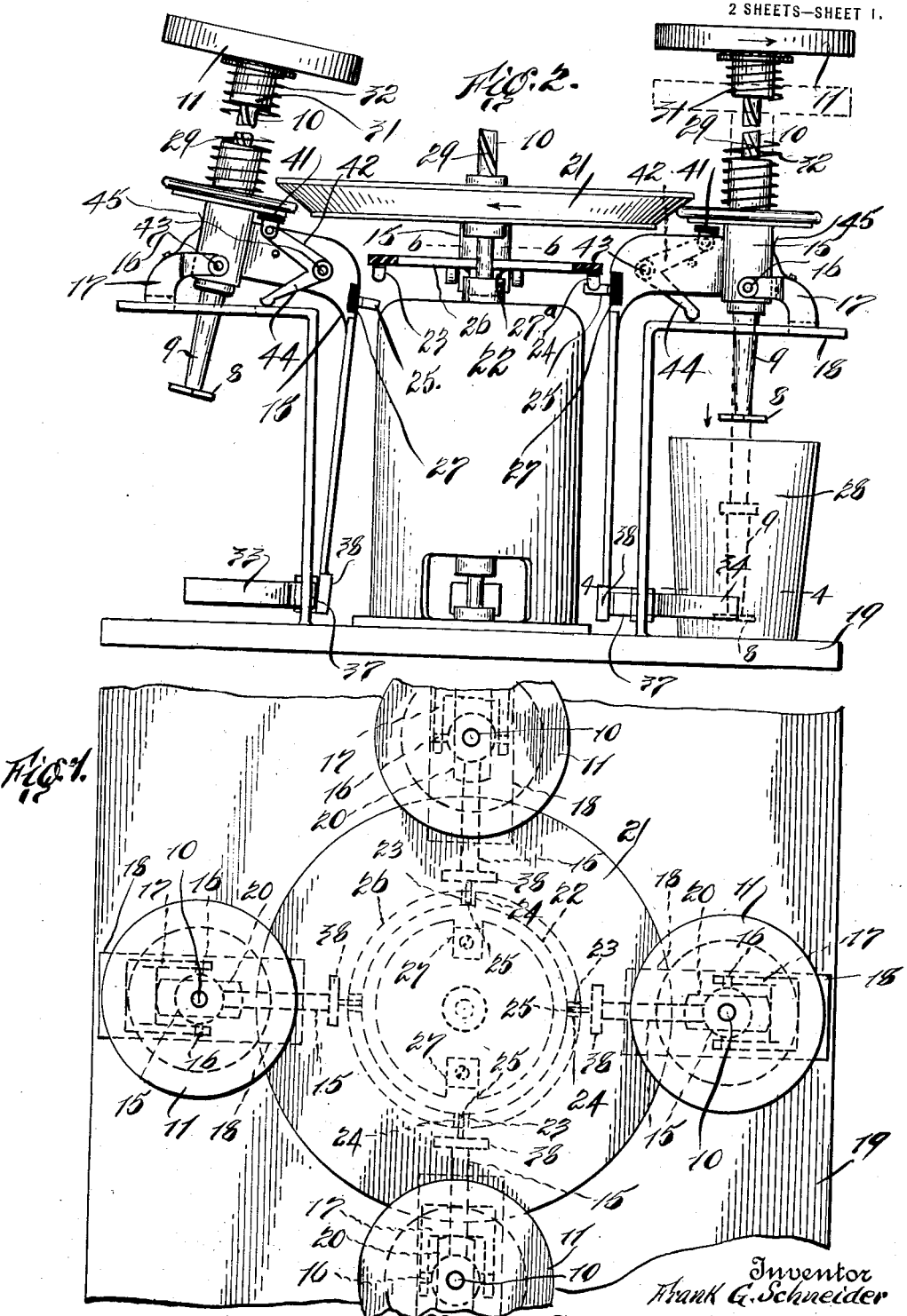
F. G. SCHNEIDER.
BEVERAGE MIXER.
APPLICATION FILED DEC. 1, 1920.
1,386,280.
Patented Aug. 2, 1921.
2 SHEETS—SHEET 1.
Inventor
Frank G. Schneider
By his Attorney

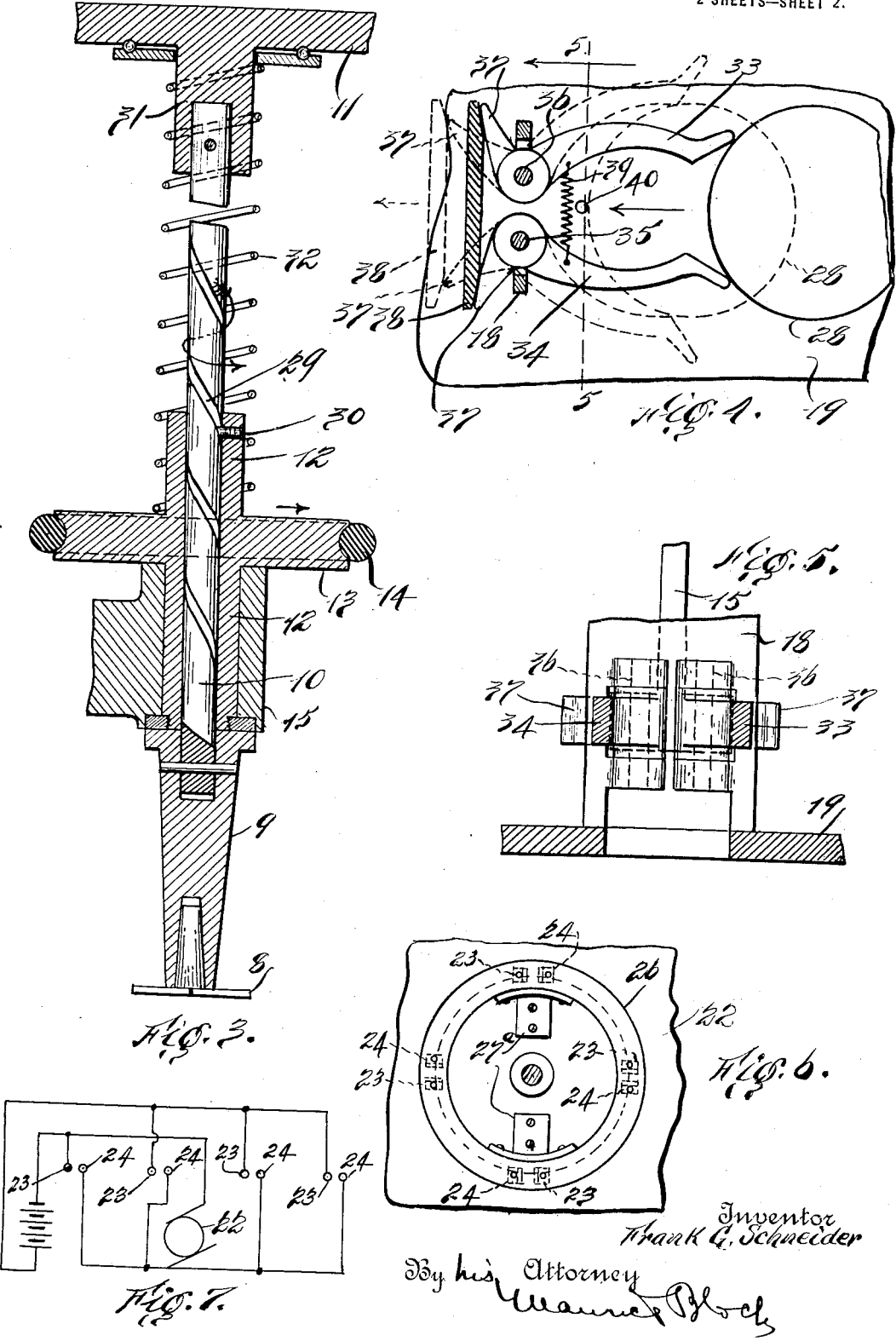

FRANK G. SCHNEIDER, OF NEW YORK, N. Y., ASSIGNOR TO SANITARY BEVERAGE MIXER CO., INC., OF NEW YORK, N. Y., A CORPORATION OF NEW YORK.

BEVERAGE-MIXER.

1,386,280.  Specification of Letters Patent.  Patented Aug. 2, 1921.

Application filed December 1, 1920. Serial No. 427,505.

*To all whom it may concern:*

Be it known that I, FRANK G. SCHNEIDER, a citizen of Hungary, residing at New York city, county, and State of New York, have invented certain new and useful Improvements in Beverage-Mixers, of which the following is a full, clear, and exact description.

This invention relates to improvements in apparatus for mixing beverages, such as are dispensed at soda fountains.

One of the objects of my invention is to provide an apparatus of the character described which is arranged to operate a plurality of mixing devices from a common source, operative connection between the mixing devices and source of operation therefor being controlled by the receptacles, such as the glasses in which the beverages are mixed; that is to say, when the glasses are inserted under the mixing element, the operation of placing the glasses under said element will cause the glasses to actuate suitable mechanism to cause the mixer for the beverage within the glasses to rotate. While the device is arranged to operate a plurality of mixers simultaneously, it is also arranged to permit any one mixer to operate independently of the others.

The foregoing is a mere outline of my invention, further details being hereinafter disclosed.

In the accompanying drawings:—

Figure 1 is a fragmentary top plan view of my improved mixing apparatus, illustrating same in a general way;

Fig. 2 is a side elevation, one of the mixers being omitted;

Fig. 3 is an enlarged vertical sectional view of one of the mixers;

Fig. 4 is an enlarged fragmentary sectional detail view, the section being taken on a line 4—4 in Fig. 2;

Fig. 5 is a fragmentary vertical sectional view, the section being taken on a line 5—5 in Fig. 4;

Fig. 6 is a detail plan view, illustrating the support carrying the contacts which coöperate with a circuit-closer to complete the motor circuit; and Fig. 7 is a diagrammatic view, illustrating the circuit layout.

To carry my invention into practice, I employ a plurality (in this instance four) of frictionally driven mixing devices 8 of any well known type. Each mixer 8 will be carried by a rotatable chuck 9, in turn carried by a rotatable spindle 10 which at its upper end carries a fly-wheel or disk 11. Each spindle 10 is carried by the hub 12 of a disk 13 which in turn is provided with a friction element 14, such as a leather or rubber band. Each disk 13, and its hub 12, will be rotatably supported by a bracket or frame 15 which in turn is pivotally connected at 16 to a fork bracket or support 17 carried by a standard 18 supported by a base-plate 19. Each chuck 9 passes through an opening 20 in its adjacent standard 18 (see Fig. 1). Each disk 13 coöperates with a driven master disk 21, in turn operated preferably by an electric motor 22, the circuit for which includes circuit contacts 23 and 24, one pair adjacent each pivotal frame 15, and a circuit closer 25, one on each of the frames 15. The contacts 23 and 24 will be carried by a support 26 of insulating material and the circuit closers 25 by a block 27 of insulating material on each frame 15. In this instance, support 26 is carried by the motor 22 by means of brackets $27^a$. After any one of the disks 13, or rather the frictional strap 14 carried by such disk, is brought into contact with the master or driving-disk 21, the spindle 10 and the thereby supported mixer 8 will rotate for the reason that the circuit-closer 25 on that frame which has been moved to bring about the aforesaid result will have bridged the adjacent contacts 23 and 24 and closed the circuit for the motor. After another disk 13 is moved to contact with the master disk 21, its spindle and mixer will rotate. It is obvious that all of the spindles 10 can be caused to operate simultaneously if desirable. The circuit for the motor will not be affected by causing all of the contacts to be bridged at the same time. The disconnection of any one circuit-closers 25 from its contacts 23 and 25, should all of the mixers be in operation, will not stop the motor. The circuit for the motor will not be broken until all of the circuit-closers are withdrawn. After a spindle 10 has been caused to rotate, it will automatically move downwardly to cause the mixer 8 to enter the liquid in its adjacent receptacle, indicated by 28.

To accomplish the lowering of the spindle 10, I provide each spindle with a thread 29 in the form of a helical groove, which is engaged by a pin 30 carried by its adjacent hub 12. When a hub 12 is rotated, its spindle will lag, due to the inertia of the flywheel and spindle; hence the pin 30 will act as a nut and the spindle will be caused to descend and cause the mixer to enter the glass. When the hub 31 of the fly-wheel contacts with the hub 12, the spindle will rotate with said hub, thereby causing the mixer to agitate the liquid within the glass. During the downward movement of the spindle, a relatively weak spring 32, carried by the spindle, will be compressed. After a spindle has ceased rotating, the spring will restore the spindle to its normal raised position. The direction of rotation of the master-disk will be counter clockwise, which motion will rotate the disks 13 clockwise, or in proper direction to move the spindles 10 downwardly.

As has been stated, the operation of the mixers is controlled by the placing of a glass in position. When a glass is placed in position, the frame 15, adjacent thereto, will be swung upon its pivots 16, from the position indicated at the left of Fig. 2 to the position indicated at the right of said figure, which movement will cause the disk 13 carried by the moved frame to become connected or rather to contact the master disk 21 by means of the band 14. Shortly before the disk 13 becomes connected to or with disk 21, the circuit closer 25 will enter between the contacts 23 and 24 and close the circuit for the motor 22; hence, by the time that disks 21 and 13 become connected, said disk 21 will be in motion.

To operate or swing the frames 15 upon their pivots, I provide, adjacent each frame, a pair of lever arms 33 and 34 arranged in the form of a jaw to receive the glasses (see Fig. 4). Each arm 33 and 34 is pivotally connected to the adjacent standard 18 at 35 and 36, respectively. Each arm 33 and 34 carries a cam 37 contacting with the shoe portion 38 of the adjacent frame 15. The arms 33 and 34 will be held closed, which is their normal position (see Fig. 4), by a spring 39, at which time the adjacent frame 15 will be positioned to maintain disks 13 and 21 out of operative connection. When a glass is forced between the arms 33 and 34 from full line position (Fig. 4) to the dotted line position, against stop pin 40, the frame 15 adjacent thereto, will be moved to cause its disk 13 to become connected with disk 21, and also to close the circuit for the motor 22, whereupon the adjacent spindle 10 will be lowered or moved into the glass. After a beverage has become sufficiently mixed, the glass will be withdrawn from the arms 33 and 34, or jaw formed by said arms. As the mixer will still be located within the glass, said mixer must be raised before the glass is withdrawn.

It will be seen, in Fig. 4, that when the glass if fully inserted within the jaw, the arms 33 and 34 will rest at a point about on a line with the axis of the glass or crown of its curved wall. As soon as a glass has been moved away slightly from the stop-pin 40, the jaw-arms 33 and 34 will start to close, and before the mixer 8 contacts with the wall of the glass, the movement of said glass will have been sufficient to cause the disks 13 and 21 to become disconnected. As soon as said disks become disconnected, a brake mechanism will act to arrest the rotation of the fly-wheel 11, carried by the spindle which has been in use. The brake mechanism will be arranged to act after the frames 15 have been slightly moved from operative toward inoperative position. In this instance each brake mechanism for each disk consists of a shoe 41 of any suitable material, such as leather, rubber or the like, carried by a bell crank lever 42 pivoted at 43 to a frame 15. One arm of the lever 42 carries the said shoe 41, while the other arm 44 is arranged to contact with standard 18. The end of arm 44 will rest upon standard 18 at all times, but when a spindle 10 is in use, the adjacent brake 41 will be out of contact with its disk. When a frame 15 has moved slightly from operative to inoperative position, and before a mixer 8 can contact with its glass, said shoe will contact with its disk 13 and arrest further rotation thereof. The brake-shoe 41 does not contact with its disk until said disk has cleared the master disk 21.

After a spindle has ceased rotating, its spring 32, which has been under compression, will force said spindle upwardly, thereby causing the mixer to leave the glass, after which the glass can be entirely withdrawn from the jaw formed by arms 33 and 34.

It will be apparent that it will not be possible to withdraw a glass without first stopping the mixing element; hence, an operator cannot leave the apparatus with the spindles in motion. It will also be apparent that the operator has but to insert the glass and withdraw it, the rest of the operation being automatic. A spring 45, for each frame 15, will act to maintain the shoe 38 thereof in contact with cams 37 and also to restore the frame to normal position, after a glass has been withdrawn.

Having described my invention, what I claim and desire to secure by Letters Patent is:—

1. In a mixing device, a rotatable carrier, a threaded spindle supported by the carrier and rotatable thereby, means carried by the carrier to engage the threads on said spindle, a weight carried by the spindle adapted to cause said spindle to lag when the carrier is rotated, whereby said spindle will be moved downwardly after the carrier has been placed in motion, and means carried by the spindle to contact with said carrier, when said spindle has been moved downwardly to its full extent, whereby said spindle will be rotated by the rotation of the carrier.

2. In a mixing device, a rotatable carrier, a threaded spindle supported by the carrier and rotatable thereby, means carried by the carrier to engage the threads on said spindle, a weight carried by the spindle adapted to cause said spindle to lag when the carrier is rotated, whereby said spindle will be moved downwardly after the carrier has been placed in motion, means carried by the spindle to contact with said carrier, when said spindle has been moved downwardly to its full extent, whereby said spindle will be rotated by the rotation of the carrier, and means to return the spindle to normal position after the rotation thereof has ceased.

3. In a beverage mixing device, a movable frame, a friction disk rotatably supported thereby, a spindle operable by said disk, a driven master friction disk adjacent the disk on said frame, said disks being normally out of contact one with the other, means operable by a receptacle containing the beverage to be mixed, while being placed under said spindle, arranged to move the frame to cause the disk on said frame to contact with the master disk, and a brake mechanism arranged to arrest the rotation of the disk carried by the movable frame after said frame has been moved by the withdrawal of the receptacle, sufficiently to cause said disks to separate.

4. In a beverage mixer, a plurality of pivotal frames, a mixing device carried by each frame, a driving mechanism common to all of said mixing devices, means associated with each mixing device, arranged to coöperate with the driving mechanism to operate the mixing devices, an electric motor to operate the driving mechanism, a circuit therefor, contacts included in said circuit, means carried by each pivotal frame to bridge said contacts to close the circuit for said motor, and means actuated by a receptacle containing the beverage to be mixed, to move said frames to cause the circuit for the motor to be closed, when a receptacle is placed in position relative to its mixing device.

5. In a beverage mixer, a plurality of pivotal frames, a mixing device carried by each frame, a driving mechanism common to all of said mixing devices, means associated with each mixing device, arranged to coöperate with the driving mechanism to operate the mixing devices, an electric motor to operate the driving mechanism, a circuit therefor, contacts included in said circuit, means carried by each pivotal frame to bridge said contacts to close the circuit for said motor, and a lever mechanism actuated by a receptacle containing the beverage to be mixed, to move said frames to cause the circuit for the motor to be closed, when a receptacle is placed in position relative to its mixing device.

6. In a mixing device, a carrier, a rotatable mixer carried thereby, arranged for movement longitudinally thereof, means dependent upon the positioning of a receptacle containing the beverage to be mixed, to control the operation of the mixer when the receptacle is placed in proper position relative to the mixer, means to automatically cause the mixer to be lowered into the receptacle after said receptacle has been positioned, and means to cause the mixer to automatically rise out of the receptacle after the receptacle has been partly withdrawn from the position previously occupied thereby.

7. In a mixing device, a carrier, a rotatable mixer carried thereby, arranged for movement longitudinally thereof, means dependent upon the positioning of a receptacle containing the beverage to be mixed to control the operation of the mixer when the receptacle is placed in proper position relative to the mixer, means to automatically cause the mixer to be lowered into the receptacle after said receptacle has been positioned, means to cause the mixer to automatically rise out of the receptacle after the receptacle has been partly withdrawn from the position previously occupied thereby, and a brake mechanism arranged to automatically operate to arrest rotation of the mixer, after a receptacle has been withdrawn.

8. In a mixing device, a carrier, a rotatable mixer carried thereby arranged for movement longitudinally thereof, means dependent upon the positioning of a receptacle containing the beverage to be mixed to control the operation of the mixer when the receptacle is placed in proper position relative to the mixer, means to automatically cause the mixer to be lowered into the receptacle after said receptacle has been positioned, means to cause the mixer to automatically rise out of the receptacle after the receptacle has been partly withdrawn from the position previously occupied thereby, a brake mechanism arranged to automatically operate to arrest rotation of the mixer, after a receptacle has been withdrawn, and means arranged to restore the mixer to normal position after the rotation thereof has ceased.

Signed at New York city, N. Y., this 29th day of November, 1920.

FRANK G. SCHNEIDER.

Witnesses:
MAURICE BLOD,
EDWARD A. JARVIS.